United States Patent Office 3,686,066
Patented Aug. 22, 1972

3,686,066
SHAPED ARTICLES FROM NYLON-4
Edward M. Peters, Ridgefield, Conn., assignor to Radiation Research Corporation, Stamford, Conn.
No Drawing. Filed Sept. 3, 1970, Ser. No. 69,500
Int. Cl. D04h 1/06; B32b 3/10
U.S. Cl. 161—150
16 Claims

ABSTRACT OF THE DISCLOSURE

Shaped articles of nylon-4 self-bonded together in an integral structure. These articles can be obtained when nylon-4 is swollen with water and dried under pressure and a temperature below the melting point of nylon-4.

---

This invention relates to shaped articles from nylon-4.

Nylon-4 is the polymer of 2-pyrrolidone, which has been well described in the literature. An improved, high molecular weight nylon-4 is described in copending application Ser. No. 763,898, filed Sept. 30, 1968, entitled "Polymers of 2-Pyrrolidone," inventor Carl E. Barnes, now abandoned, and in the continuation-in-part application thereof Ser. No. 69,471 filed Sept. 3, 1970, both applications being incorporated herein by reference.

The present invention relates to novel shaped articles of nylon-4 self-bonded together in an integral structure and formed at temperatures significantly below the melting point of nylon-4. Such structures can be film- or sheet-like of only a few mils in thickness, or can be thick structures in the order of inches in thickness.

The shaped articles are formed by swelling nylon-4 with water, e.g. to obtain a water content of 100% or more by weight, based on the weight of the nylon-4, and drying the swollen mass under pressure. Normally a pressure of at least about 50 p.s.i. and a temperature of at least 25° C. will be used, but the temperature and pressure are inversely related; at higher pressures lower temperatures are used and at lower pressures higher temperatures are used. Usually pressures of at least about 200–500 p.s.i. are employed at temperatures of 120–145° C. The swollen mass is dried under pressure to a water content of about 7–9% by weight, based on the nylon-4, as measured at 65% relative humidity and 70° F. The use of vacuum to remove water will speed up the drying as will increasing the pressure and/or the temperature. During this entire operation, from the swollen mass to the dried product, the temperature to which the material is subjected is below the melting point of nylon-4. An integral structure is thus obtained without melt fusion and without an adhesive. Rather, under the conditions described above, the swollen nylon-4 is capable of self-bonding as it is dried under pressure. Examination of the product under a microscope reveals fiber-to-fiber welding with the integrity of the nylon-4 fibers being otherwise preserved.

One convenient way of forming the shaped articles of the invention is to dry under pressure a nylon-4 pulp on a foraminous support. In such a case, the use of suction to assist in water removal is advantageous. Products formed in this manner range from thin, tough, translucent nylon-4 films to thick, soft nylon-4 sponges. Another suitable method is to dry a swollen mass of nylon-4 under pressure in a mold.

The nylon-4 used as the starting material can be in the form of particles, precipitated particles, undrawn fiber or drawn fiber. Nylon-4 particles are readily obtained by any desired comminution of nylon-4 resin. Since the particles may be too small, even when swollen, to be retained on a formainous support of reasonable coarseness, generally nylon-4 particles will be shaped in a mold by compression molding techniques. Particles of longer length can be obtained by precipitation of nylon-4 from a solution of nylon-4 in a suitable solvent and then comminuting the precipitated mass. These precipitated particles can readily be made of a size that will be retained on a screen sufficiently coarse to readily remove water from the swollen mass of nylon-4. Nylon-4 particles having more of a fiber-like quality are obtained when high molecular weight nylon-4 polymer is employed, such as made by the processes of the aforementioned Barnes Applications. Undrawn nylon-4 fiber can be considered as a particle having a very large length dimension, and drawn fiber as having an even larger length dimension. Undrawn and drawn fiber can be employed in any desired denier and length, neither of these factors being critical. Swollen undrawn and drawn fiber can be dried under pressure on a foraminous support, or in a mold, as desired.

Other materials can be admixed with the swollen nylon-4, such as wood pulp fiber, man made fiber, e.g. cellulose acetate and viscose, and synthetic fiber, such as nylon-6, nylon-6,6 and polyesters, without the need for adhesives. Fillers can also be admixed with the swollen nylon-4. In such cases, a variety of multi-component materials can be formed without heating the material to the melting point of the nylon-4.

Composite materials can also be formed by drying under pressure a swollen mass of nylon-4, with or without other fibers and/or fillers, just enough to obtain a self-supporting article, and then, while the nylon-4 article is still wet, it is laminated to a base structure merely by drying the wet nylon-5 article under pressure while in contact with the base structure. Synthetic leather can thus be formed by admixing swollen nylon-4 with a suitable pigment, forming a wet sheet by drying the swollen nylon-4 under pressure to form a partially dried nylon-4 sheet, and simultaneously passing a felt backing sheet and the partially dried nylon-4 sheet between heated embossed nip rolls to dry the laminate. Synthetic leather formed in this manner has good breathability and a tough, leathery feel.

Paper-like materials formed by drying under pressure an admixture of swollen nylon-4 and wood pulp fiber have the advantage of greater tensile strength, folding endurance and air-permeability than does conventional cellulosic paper, and these properties increase with increasing percentages of nylon-4. By comparison, these properties decrease as the percentage of nylon-6 added to cellulose increases. Pigmenting of a nylon-4/cellulosic paper is extremely convenient, since the pigment can be added to the swollen nylon-4 or the wood pulp or both. In general, composite articles made from nylon-4 and other materials combine the moisture absorption of nylon-4 with the properties of the other material.

A major area for the articles of the present invention is in the disposables field. Surgeons' gowns, surgical drapes, bed linen and the like are readily made from nylon-4/cellulosic articles of the invention to obtain a stronger product than can be obtained from paper, and yet no adhesive is necessary. Such articles can be inexpensively made on conventional papermaking machinery.

EXAMPLE 1

A 10% solution of nylon-4 in formic acid, the nylon-4 being prepared according to the Barnes applications and having an inherent viscosity of 3.5 dl./g. (measured at 30° C. as a 0.5 g./dl. solution in anhydrous hexafluoroisopropanol) was mixed with dilute NaOH and a white precipitate was collected. This precipitate was washed with water and beaten in a Waring blendor operating at 70 volts. The swollen, precipitated particles thus formed were divided into two samples, one being dried on a 150-mesh screen and the other on a 200-mesh screen in standard Tappi handsheet molds 6 inches in diameter. Each moist couched web thus formed was heated in a press at 125° C. under 5000 p.s.i.g. to form a film-like, translucent structure having a tensile strength of about 3 lbs./in. per oz./yd.$^2$.

EXAMPLE 2

The procedure of Example 1 was followed, except that a 10% solution of nylon-4 and nylon-6 was used. A film-like translucent nylon-4/nylon-6 structure was obtained. This structure was more opaque and softer than the product of Example 1. The tensile strength was typical of nylon-6.

EXAMPLE 3

The procedure of Example 1 was followed, except that various amounts of $TiO_2$ were added to the nylon-4 solution. White, opaque sheets were obtained of very pleasing appearance. The most effective pigmentation occurred at a concentration of pigment in excess of 2% by weight.

EXAMPLE 4

Precipitated nylon-4 particles were mixed with cotton linters and water to form papermaking pulp containing 5, 10, 25 and 50% by weight of nylon-4 and 95, 90, 75 and 50% by weight, respectively, of cotton linters, based on the weight of nylon-4 and cotton linters. Using conventional papermaking machinery these pulps were formed into sheets of 30, 60 and 120 lb. basis weight (500 sheets, 24 in. x 38 in.) with a thickness ranging from 1.9 to 3.9 mils calendered and 4.5 to 11.5 mils uncalendered. The folding endurance of the nylon-4/cotton linters sheets was greater than that of a 100% cotton linters sheet, and improvements were also found in the burst strength of the nylon-4/cotton linters sheets.

EXAMPLE 5

Drawn and undrawn nylon-4 staple fiber was admixed with water and wood fiber or staple fiber of nylon-6, polyester or rayon. The fibers were from ⅛ to ¼-inch in size and were dispersed in water by agitation in a pulp beater. The pulp was formed into sheets according to the procedure of Example 1. In each case, an integral, self-supporting sheet was formed of good strength.

EXAMPLE 6

A nylon-4 sponge was formed by drying a thick mass of swollen nylon-4 precipitated particles on a 100-mesh screen under very low pressure and about 140° C.

EXAMPLE 7

Nylon-4 membranes useful as battery separators were formed by (1) drying swollen nylon-4 precipitated particles under pressure at 25° C. and (2) by drying at 125° under pressure a pulp containing nylon-4 precipitated particles and drawn nylon-4 fiber in equal parts by weight.

EXAMPLE 8

A synthetic leather was made by drying a pulp of swollen nylon-4 precipitated particles on a foraminous support while under pressure at a temperature of about 140° C. When dried sufficiently to form a self-supporting sheet, the wet sheet was removed from the support having a random, leather-like design. A felt backing sheet was placed over the wet sheet, and the laminate was dried under pressure at about 140° C. A flexible sheet was obtained having a leather-like appearance and feel.

The procedure was repeated using a nylon-4 pulp containing a red pigment, which was readily dispersed in the pulp. A red nylon-4 leather was obtained.

What is claimed is:

1. A shaped article consisting essentially of a plurality of nylon-4 units self-bonded together in an integral structure, the self-bond having been accomplished by drying under pressure said plurality of nylon-4 units swollen with water at a temperature significantly below the melting point of hte nylon-4.

2. The structure according to claim 1, wherein the form of the water-swollen nylon-4 is selected from the group consisting of particles, undrawn fiber or drawn fiber.

3. The structure according to claim 1, wherein the sheet-like structure is a wet-laid material.

4. The structure according to claim 1 containing a filler.

5. The structure according to claim 4, wherein the filler is a pigment.

6. The structure according to claim 1 including wood pulp fiber, man-made fiber or synthetic fiber or mixtures thereof.

7. The structure according to claim 1 in the form of a wet-laid sheet.

8. A method of making shaped articles of nylon-4, which comprises swelling a plurality of nylon-4 units with water and drying the swollen nylon-4 units under pressure and at a temperature significantly below the melting point of nylon-4 to self bond the swollen nylon-4 units together.

9. The method according to claim 8, wherein the swollen nylon-4 is dried under pressure in a mold to obtain a dry product of a desired shape.

10. The method according to claim 8, wherein the swollen nylon-4 is dried under pressure on a foraminous support, and suction is applied to the foraminous support during the drying to assist in water removal.

11. The method according to claim 8, wherein the swollen nylon-4 is dried to a point where a wet self-supporting structure is obtained, the wet self-supporting structure is contacted with a base structure, and the wet self-supporting structure is dried under pressure while in contact with said base structure to laminate the nylon-4 article to the base structure.

12. The method according to claim 8, wherein the form of the water-swollen nylon-4 is selected from the groups consisting of particles, undrawn fiber or drawn fiber.

13. The method according to claim 8, wherein the nylon-4 is swollen with water to obtain a water content of at least about 100% by weight, based on the weight of the nylon-4, as measured at 65% relative humidity and 70° F.

14. The method according to claim 8, wherein the swollen nylon-4 is dried to a water content of about 7 to about 9% by weight, based on the nylon-4, as measured at 65% relative humidity and 70° F.

15. The method according to claim 8, wherein the swollen nylon-4 is dried under a pressure of about 200 to about 500 p.s.i. at a temperature of about 120° to about 145° C., at higher temperatures being used at the lower pressures and vice-versa.

16. The method according to claim 8, wherein the nylon-4 is in the form of drawn or undrawn fiber.

References Cited

UNITED STATES PATENTS

| | | | |
|---|---|---|---|
| 2,869,973 | 1/1959 | Hubbard et al. | 161—150 |
| 3,322,727 | 5/1967 | Chiddix et al. | 260—78 P |
| 3,021,257 | 2/1962 | Stauffenberg | 162—162 |
| 3,271,237 | 9/1966 | Sommer et al. | 162—157 |
| 3,174,951 | 3/1965 | Taber | 260—78 P |

WILLIAM J. VAN BALEN, Primary Examiner

U.S. Cl. X.R.

8—130.1; 161—120, 227; 162—146, 157 R, 162; 260—78 P